US008915135B2

(12) United States Patent
Scott

(10) Patent No.: US 8,915,135 B2
(45) Date of Patent: Dec. 23, 2014

(54) BAROMETER

(76) Inventor: Kevin Francis Scott, Selkirkshire (GB)

(*) Notice: Subject to any disclaimer, the term of this patent is extended or adjusted under 35 U.S.C. 154(b) by 758 days.

(21) Appl. No.: 13/085,747

(22) Filed: Apr. 13, 2011

(65) Prior Publication Data

US 2011/0247412 A1   Oct. 13, 2011

(30) Foreign Application Priority Data

Apr. 13, 2010   (GB) .................................. 1006068.9

(51) Int. Cl.
*G01L 7/00*   (2006.01)
*G01L 7/20*   (2006.01)
*G01L 7/18*   (2006.01)

(52) U.S. Cl.
CPC ................. *G01L 7/182* (2013.01); *G01L 7/187* (2013.01)
USPC .............................................. 73/384; 73/700

(58) Field of Classification Search
None
See application file for complete search history.

(56) References Cited

U.S. PATENT DOCUMENTS

| 2,099,385 | A | * | 11/1937 | Ciamberlini | 73/500 |
| 2,953,025 | A | * | 9/1960 | Hicks | 73/384 |
| 6,319,469 | B1 | * | 11/2001 | Mian et al. | 422/64 |
| 6,709,869 | B2 | * | 3/2004 | Mian et al. | 436/45 |

FOREIGN PATENT DOCUMENTS

GB   315325   7/1929
JP   60025431 A   *   2/1985

OTHER PUBLICATIONS

Search Report dated Feb. 26, 2011 issued in priority application GB1006068.9.
Scott, Kevin; *Barometry Without Mercury*; The Journal of the Institute of Science and Technology; pp. 31 to 35; Winter 2010; ISSN 2040-1868.

* cited by examiner

*Primary Examiner* — Lisa Caputo
*Assistant Examiner* — Jermaine Jenkins
(74) *Attorney, Agent, or Firm* — Nixon & Vanderhye P.C.

(57) ABSTRACT

A barometer which is rotatable and a method of using a barometer which is rotatable is presented comprising a barometer tube retaining barometric fluid that is shorter than that required by non-rotatable barometers. The provision of a rotatable barometer allows the use of a barometric fluid of a density lower than that of mercury to be used, thereby enabling the use of mercury to be avoided.

16 Claims, 6 Drawing Sheets

BAROMETER

This application claims priority to GB Application No. 1006068.9 filed 13 Apr. 2010, the entire contents of each of which are hereby incorporated by reference.

FIELD OF THE INVENTION

The invention relates to the field of measuring atmospheric pressure and instruments to measure atmospheric pressure.

BACKGROUND TO THE INVENTION

Instruments allowing the measurement of atmospheric pressure, known as barometers, have been known for the past 350 years or so. The first such instruments comprised a tube filled with water suspended above a reservoir of water whereby the height of the column of water within the tube falls until the weight of water within the tube offsets the pressure exerted by the atmosphere on the body of the reservoir.

A significant improvement to this type of barometer came about when the fluid within the tube and reservoir was replaced with mercury (for example, the Fortin barometer). Due to the much greater density of mercury, the required tube length required to counterbalance atmospheric pressure for a given tube diameter is corresponding much shorter, at least 84 cm compared to the approximately 10 m tube lengths required for water based Fortin-like barometers. Fortin barometers are highly accurate, with the change in column length for a given change in pressure being largely linear, and give an absolute value for the atmospheric pressure.

In the current political and environmental climate, there is a general desire to replace instruments containing mercury, such as Fortin barometers, with mercury free alternatives. The alternative types of barometers currently available, such as aneroid barometers, the Sympiesometer, quartz Bourdon instruments and electronic instruments, do not measure absolute pressure as such and each requires separate, reference measurements to be taken, leading to the instruments being complicated to use and requiring care when the instruments are set up and operated.

Accordingly, it is an object of the invention to provide an absolute barometer which does not contain mercury.

SUMMARY OF THE INVENTION

According to a first aspect of the invention there is provided a barometer which is rotatable to allow the use of a barometer tube shorter than that required by a non-rotatable barometer.

The invention also extends in a second aspect to a method of taking a measurement of air pressure comprising the steps of: providing a barometer according to the first aspect of the invention; rotating the barometer; and taking a reading of the air pressure from the barometer whilst the barometer is being rotated.

Generally, a barometer such as the Fortin barometer, for example, balances the pressure exerted on a reservoir or cistern of barometric fluid by the atmosphere with the pressure exerted on the same reservoir of barometric fluid by a column of the same barometric fluid. During assembly, a barometer tube with a sealed end is filled with the barometric fluid and then inverted over the reservoir of barometric fluid. The level of the barometric fluid within the barometer tube falls until the pressure exerted by the column of barometric fluid on the reservoir equals the pressure exerted on the reservoir by atmospheric pressure. Therefore, a vacuum (sometimes called the "Torricellian vacuum") is formed between the barometric fluid and the sealed end of the barometer tube.

The pressure exerted by the column of barometric fluid is dependent on the height of the column above the level of the barometric fluid within the reservoir and the density of the barometric fluid according to equation (1). For example, a column of mercury with a density of 13.564 gcm$^{-3}$, requires a column height of approximately 76 cm to balance standard atmospheric pressure (that is, 1 atm, 101,325 Pa or 1013 mB).

$$P = \rho \cdot h \cdot a \qquad (1)$$

$$h = \frac{P}{\rho \cdot a}$$

where P is the air pressure, $\rho$ is the density of the barometric fluid and a is the acceleration on the barometric fluid.

However, if the barometer is subject to rotation, the centrifugal acceleration produced may increase the pressure exerted by a given column of barometric fluid such that a shorter column of fluid may be used. For example, according to equation (2), a mercury barometer that required a column of 76 cm to balance standard atmospheric pressure as described above, would only require a column of approximately 15 cm when rotated at 5 revolutions per second with a mid-column radius of 5 cm.

$$P = \rho \cdot h \cdot \alpha$$

where acceleration is due to rotation $\alpha = r \cdot \omega^2$ $$\therefore P = \rho \cdot h \cdot r \cdot \omega^2 \qquad (2)$$

$$\omega = 2\pi \cdot S \Rightarrow h = \frac{P}{4\pi^2 \cdot S^2 \cdot \rho \cdot r}$$

where $\omega$ is the rotational acceleration, S is the rate of rotation and r is the radial distance of the midpoint of the column of barometric fluid form the centre of rotation Therefore, a barometer that may be rotated according to the present aspect of the invention may comprise a much shorter barometer tube within which barometric fluid is retained and still be able to measure atmospheric pressure.

The barometer tube typically has a sealed end and an open end. Preferably, the length of the barometer tube is such that when the barometer is at rest and the open end is at standard atmospheric pressure, the barometric fluid abuts the sealed end.

The barometer tube may be less than 84 cm in length, preferably, less than 50 cm in length and more preferably less than 25 cm in length.

Accordingly, the present aspect of the invention extends to a barometer comprising a barometer tube retaining a barometric fluid; characterised by the barometer being rotatable such that the barometer tube is shorter than that required by a non-rotatable barometer.

Preferably, the barometer tube retains a barometric fluid having a lower density than that of mercury (13.564 gcm$^{-3}$).

The barometric fluid typically has a density of less than 10 gcm$^{-3}$. Preferably, the barometric fluid has density of less than 2 gcm$^{-3}$, more preferably less than 1.5 gcm$^{-3}$. For example, the barometric fluid may have a density of approximately 0.9 gcm$^{-3}$.

The invention extends to a rotatable barometer having a barometer tube of less than 84 cm in length, the barometer tube retaining a barometric fluid having a lower density than that of mercury (13.564 gcm$^{-3}$).

The invention extends to a barometer which can be mechanically rotated to allow the use of a barometric fluid of lower density than mercury and a barometer tube shorter than that required by a non-rotated barometer.

The barometer may be mechanically rotated to allow the use of a barometric fluid of lower density than mercury. The barometer may be mechanically rotated to allow the use of a barometer tube shorter than that required by a non-rotated barometer.

At the current time, there are strong political and environmental incentives to replace instruments containing mercury, with alternative, mercury free, instruments. Therefore, a barometric fluid other than mercury is needed if a Fortin-type instrument is required. Alternative barometric fluids will generally have a lower density than mercury and will therefore require barometer tube length of correspondingly greater length.

The length of barometer tube required to measure air pressure is inversely proportional to the density of the barometric fluid and the acceleration applied to the barometric fluid (due to gravity for a standard Fortin-type barometer) according to equation (1). Rotating the barometer increases the acceleration on the barometric fluid and accordingly, reduces the barometer tube length required to make air pressure measurements for a given density of barometric fluid.

For example, if the barometric fluid is water, having a density of 1 gcm$^{-3}$, the required height of barometric fluid to balance standard atmospheric pressure for a Fortin-type barometer according to equation (1) is over 10 m. However, if the barometer according to the first aspect of the invention is rotated according to the second aspect of the invention at a rate of 10 revolutions a second at a radius of 5 cm from the centre of rotation, the height of barometric fluid required to balance atmospheric pressure according to equation (2) is 51 cm.

Typically, the barometric fluid is a fluid with a low volatility/vapour pressure to minimise boiling off of the barometric fluid into the Torricellian vacuum created within the barometer tube of the barometer. The barometric fluid may have a vapour pressure of less than 100 Pa. The barometric fluid may have a vapour pressure of less than 10 Pa. Preferably, the barometric fluid has a vapour pressure of less than 1 Pa.

Typically, the barometric fluid has a low melting point such that within the range of ambient temperature the barometric fluid is a liquid and the viscosity of the barometric fluid does not change significantly.

Typically, the barometric fluid is a fluid with a low affinity for the material of the barometer tube to prevent wetting of the inner surface of the barometer tube by the barometric fluid, which might otherwise obscure the position of the barometric fluid/vacuum interface.

If a barometric fluid has a high surface tension and a high affinity for the inner walls of the barometer tube, for example, an aqueous barometric fluid, the inner bore of the barometer tube must be large enough to prevent capillary action. Capillary action is the effect of a liquid rising up a sufficiently thin tube against gravity, for example, and occurs where the surface tension and affinity of the liquid for the walls of the thin tube overcome the forces on the liquid due to gravity.

However, under sufficient rotational motion, the increased acceleration can overcome this capillary action. Therefore, the rotation of a barometer according to the second aspect of the invention allows tubes with much smaller internal bores to be used with barometric fluids with high surface tension and/or a high affinity for the barometer tube walls.

The barometric fluid may be an oil. Typically, the barometric fluid is a mineral oil. For example, the barometric fluid may be Dow Corning 702 (Dow Corning is a registered trade mark of Dow Corning Corporation, US) or Aeroshell fluid 3 (Aeroshell is a registered trade mark of Shell Brands International AG, Switzerland). The barometric fluid may be a silicone oil, such as those typically used in diffusion pumps, for example. The barometric fluid may be a mixture of silicone oils, such as phenylmethyl dimethyl cyclosiloxanes.

The barometer may be rotatable within a centrifuge. The barometer may comprise a housing within which the barometer tube is mounted. The housing may be suitable for placing within the carrier of a standard laboratory centrifuge.

The barometer may be rotated by means of a centrifuge to allow the use of a barometric fluid of lower density than mercury and a barometer tube shorter than that required by a non-rotated barometer.

The barometer may be rotated by means of a centrifuge to allow the use of a barometric fluid of lower density than mercury.

The barometer may be rotated by means of a centrifuge to allow the use of a barometer tube shorter than that required by a non-rotated barometer.

Preferably, the barometer comprises a rotatable mount, the rotatable mount having a centre of rotation. The barometer tube may be located on the rotatable mount on one side of the centre of rotation.

The rotatable mount may comprise a printed circuit board. The rotatable mount may be circular.

The barometer tube may comprise a sealed first end and an open second end. The barometer tube may comprise a first tube portion adjacent to the sealed first end and a second tube portion adjacent to the open second end. The first tube portion may be adjacent to the second tube portion.

The open second end may be located near to the centre of rotation. For example, the open second end may be within 15%, 10% or within 5% of the span of the rotatable mount (diameter, in the case of a circular rotatable mount) of the centre of rotation. The sealed first end of the barometer tube may be at least 5% of the span of the rotatable mount from the centre of rotation. Preferably, the sealed first end of the barometer tube is at least 10% of the span of the rotatable mount from the centre of rotation.

The acceleration applied to the barometric liquid within the barometer tube and the angular velocity of the barometer tube is dependent on the distance the liquid is from the centre of rotation, the further from the centre of rotation the greater the applied acceleration for a given rate of rotation. To minimise the velocity of air passing the open end of the barometer tube, it is advantageous to have the said open end close to the centre of rotation. In addition, the sealed end of the barometer tube should be sufficiently far away from the centre of rotation to ensure that the required acceleration is applied to the barometric fluid retained within the first portion of the barometer tube.

The barometer tube may comprise a reservoir or cistern retaining barometric fluid. A section of the first portion of the barometer tube may extend into the reservoir, such that when the reservoir retains barometric fluid, the said section extends below the surface of the barometric fluid retained within the reservoir. Preferably, the barometric fluid within the reservoir is exposed to the air surrounding the barometer via the second tube portion such that atmospheric pressure, for example, may be exerted on the said barometric fluid.

Alternatively, the barometer tube may comprise a first linear tube portion, a second linear tube portion and a curved tube portion connecting the first linear tube portion and the second tube portion such that when the barometer is rotated, the barometric fluid moves out of the first tube section into the curved tube section. During rotation, the barometric fluid may move from the first linear tube section, through the curved tube section and into the second linear tube section.

The barometer tube may comprise a blocking means, such as a valve, for example, which prevents egress of the barometric fluid from the barometer tube.

Preferably, the barometer further comprises a first sensor operable to measure data relating to position of the barometric fluid/vacuum interface whilst the barometer is being rotated. The barometer may comprise a processor or microcontroller, operable to receive data relating to the barometric fluid and to calculate the air pressure from the received data.

The barometer may further comprise an optical and electronic method of determining the position of the barometric liquid height while the instrument is rotating.

The barometer may further comprise a second sensor operable to measure the rate of rotation of the barometer. The second sensor may be a magnetic sensor, for example.

The barometer may further comprise an optical and electronic method of determining its rotational speed while the instrument is rotating.

The first sensor may comprise a series of discrete sensors, each discrete sensor within the series of discrete sensors being operable to indicate whether the barometric fluid extends over a specific position in the barometer tube.

For embodiments where the barometric fluid absorbs radiation of a suitable wavelength (for example, visible light), the sensor may comprise a series of light sources and a series of opposed light detectors, each light source having an opposed light detector operable to detect light emitted by the said light source. Preferably, the barometric fluid absorbs light of the wavelength emitted by the series of light sources. If the barometric fluid extends over the location of a light source/detector pair, the light reaching the light detector from the respective light source is attenuated and therefore a signal indicating that the barometric liquid extends over the light source/light detector pair is produced. If the barometric fluid does not extend over the location of a light source/detector pair the light reaching the light detector from the respective light source is not attenuated and therefore a signal indicating that the barometric fluid does not extend over the specific light source/detector pair is produced.

The barometric fluid may comprise a dye that absorbs radiation of a suitable wavelength emitted by each light source in the light source/detector pairs, The barometric fluid may comprise a dye that absorbs radiation of a suitable wavelength detected by each detector in the light source/detector pairs.

Typically, the barometric fluid extends to the sealed end of the barometer tube when the barometer is at rest. When the barometer is rotated at a sufficient rate, the barometric fluid moves away from the sealed end of the barometer tube, creating a vacuum between the barometric fluid and the said sealed end of the barometer tube.

The series of sensors may measure the change in position of the barometric fluid/vacuum interface as the barometer is accelerated and decelerated. The series of sensors may measure the change in position of the barometric fluid/vacuum interface sequentially.

The barometer may comprise a further sensor operable to measure data relating to the position of the barometric fluid/air interface whilst the barometer is being rotated. The further sensor may comprise a series of discrete sensors, each discrete sensor within the series of discrete sensors being operable to indicate whether the barometric fluid extends over a specific position in the barometer tube. In embodiments where the barometer tube comprises a reservoir, the further sensor may be operable to measure data relating to the position of the barometric fluid/air interface within the reservoir. In embodiments where the barometer tube comprises a curved portion connecting a first linear portion to a second linear portion, the further sensor may be operable to measure data relating to the position of the barometric fluid/air interface within the second linear tube portion.

The position of the barometric fluid/vacuum interface and/or the barometric fluid/air interface may be measured for a single rate of rotation. The position of the said interface/s may be measured for a plurality of rates of rotation.

The position of the barometric fluid/vacuum interface and/or the barometric fluid/air interface may be calculated by measuring the change in the electrical resistivity of a portion of the barometer tube as the barometric fluid moves out of or into the said portion of the barometer tube whilst the barometer is accelerated and decelerated. The position of the barometric fluid may be calculated by measuring a change in the electrical capacitance of a portion of the barometer tube as the barometric fluid moves out of or into the said portion of the barometer tube whilst the barometer is accelerating and decelerating.

A reading of air pressure may be taken whilst the barometer is rotating by photography, for example, flash photography. The position of the barometric fluid/vacuum interface recorded from the photograph may be noted and the air pressure calculated from the position of the barometric fluid/vacuum interface.

The barometer may further comprise a temperature sensor. The data from the temperature sensor may be used to correct the value of the air pressure calculated by the barometer to allow for the thermal expansion of the barometric fluid.

Further properties of the barometric fluid may be used to correct the value of the air pressure calculated by the barometer such as the surface tension, for example.

The compression of the air in the second tube portion and/or the reservoir due to the rotation of the barometer may be used to correct the calculated value of the air pressure.

The barometer may be suitable for use with an optical drive. For example, the rotatable mount may be a disc. This disc may have a diameter of 12 cm. The rotatable mount may have a first side comprising the barometer tube and an opposed second side; the barometer further comprising a processor operable to calculate air pressure from the position of the barometric fluid/vacuum interface; wherein the calculated air pressure is readable from the second side of the rotatable mount by the Laser of an optical drive.

The method of taking a measurement of air pressure may comprise the steps of;
providing a barometer suitable for use with an optical drive and a computer comprising an optical drive, a processing unit and a display;
inserting the barometer into the optical drive of the computer;
reading the calculated air pressure from the barometer with the laser of the optical drive; and
displaying the calculated air pressure on the display of the computer.

The optical drive may be a CD-ROM drive, a DVD drive, a Blu-Ray drive or any other type of optical drive.

The second side of the rotatable mount may store optically readable data instructing the processor of a computer at which speed the optical drive should rotate the barometer.

The second side of the rotatable mount may store optically readable data instructing the processor of a computer to position the laser reader of the optical drive such that a signaling device, such as an infra-red LED, may transfer data comprising the calculated air pressure to the computer via the laser reader. The optically readable data typically comprises program code executable by a computer. It may also comprise an autorun.inf or other information file.

The signaling device may transfer data comprising recorded values such as the final position of the barometric fluid/vacuum interface, the change in position of the said interface and the temperature of the barometer, for example. The second side of the rotatable mount may store a program readable by the optical drive instructing the processor of the computer how to calculate the air pressure from received data. The processor of the computer may then calculate the air pressure using the transferred data.

DESCRIPTION OF THE DRAWINGS

An example embodiment of the present invention will now be illustrated with reference to the following Figures in which.

DETAILED DESCRIPTION OF AN EXAMPLE EMBODIMENT

Embodiment 1

Figure 1:
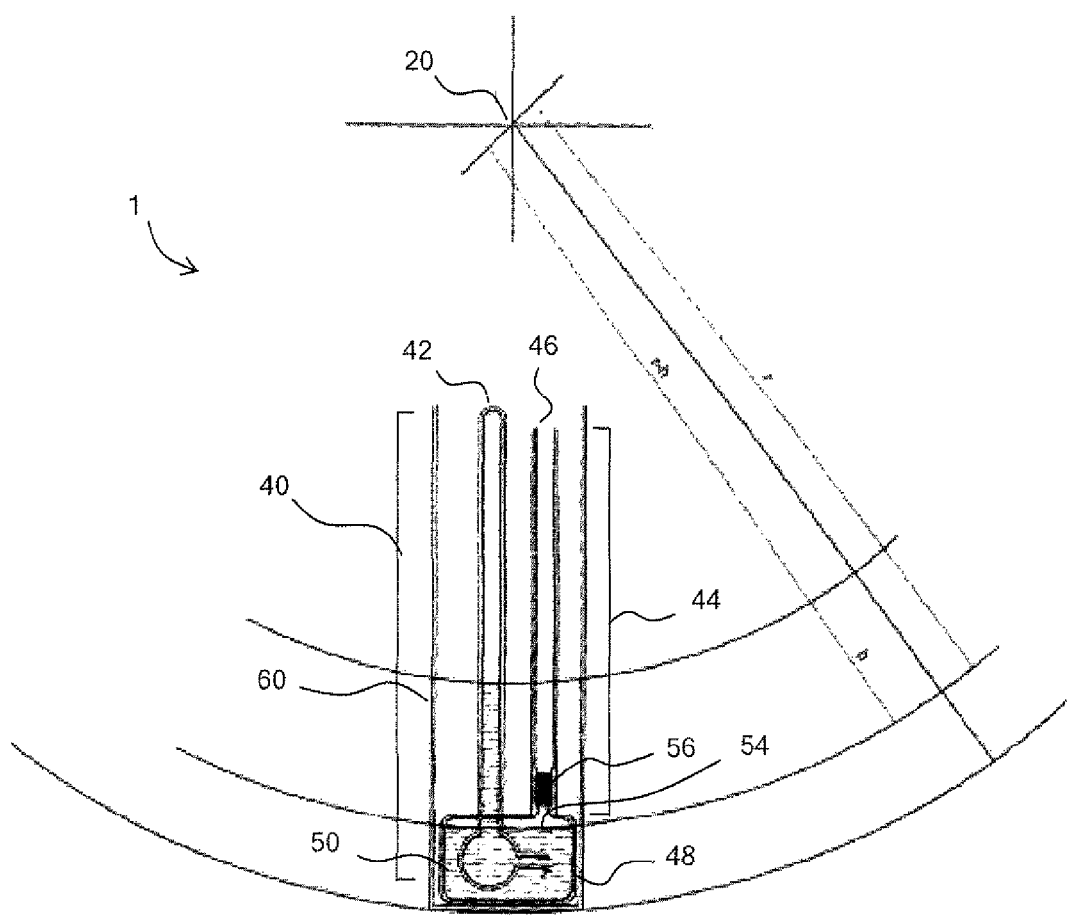
FIG. 1 is a plan view of the barometer tube of the barometer and a centre of rotation.
Figure 2:
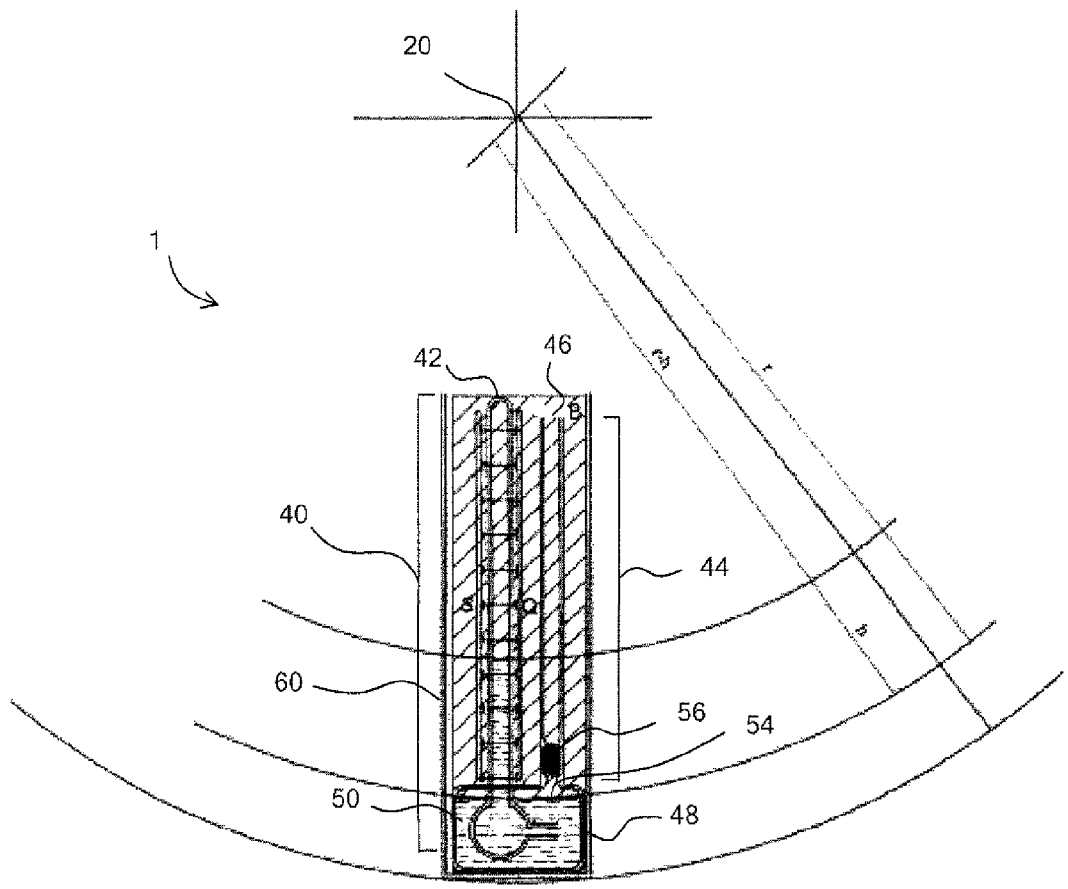
FIG. 2 is a plan view of the barometer tube showing a series of discrete sensors to report the position of the barometric fluid/vacuum interface.
Figure 3:
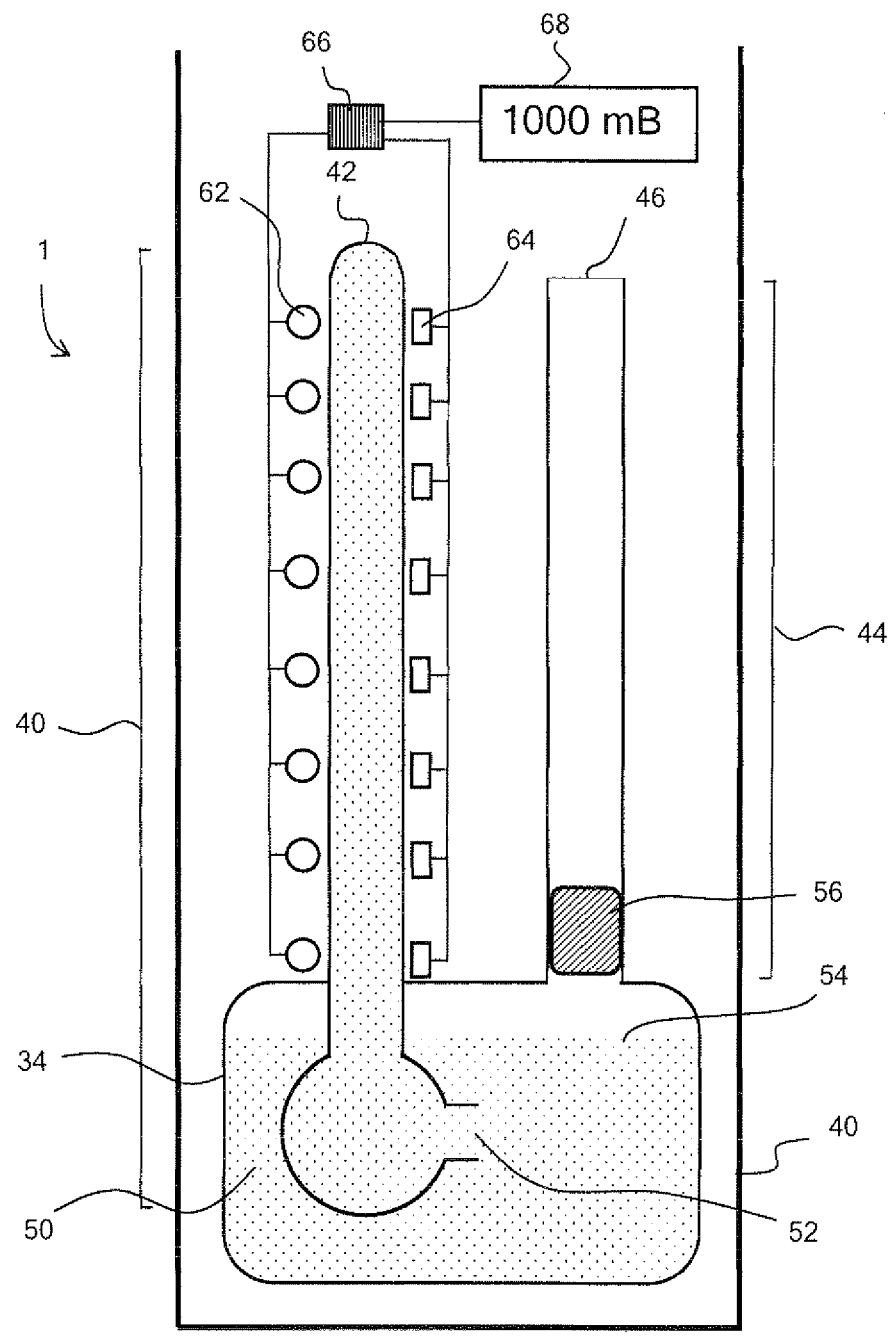
FIG. 3 is a plan view of a barometer from above.
Figure 4:
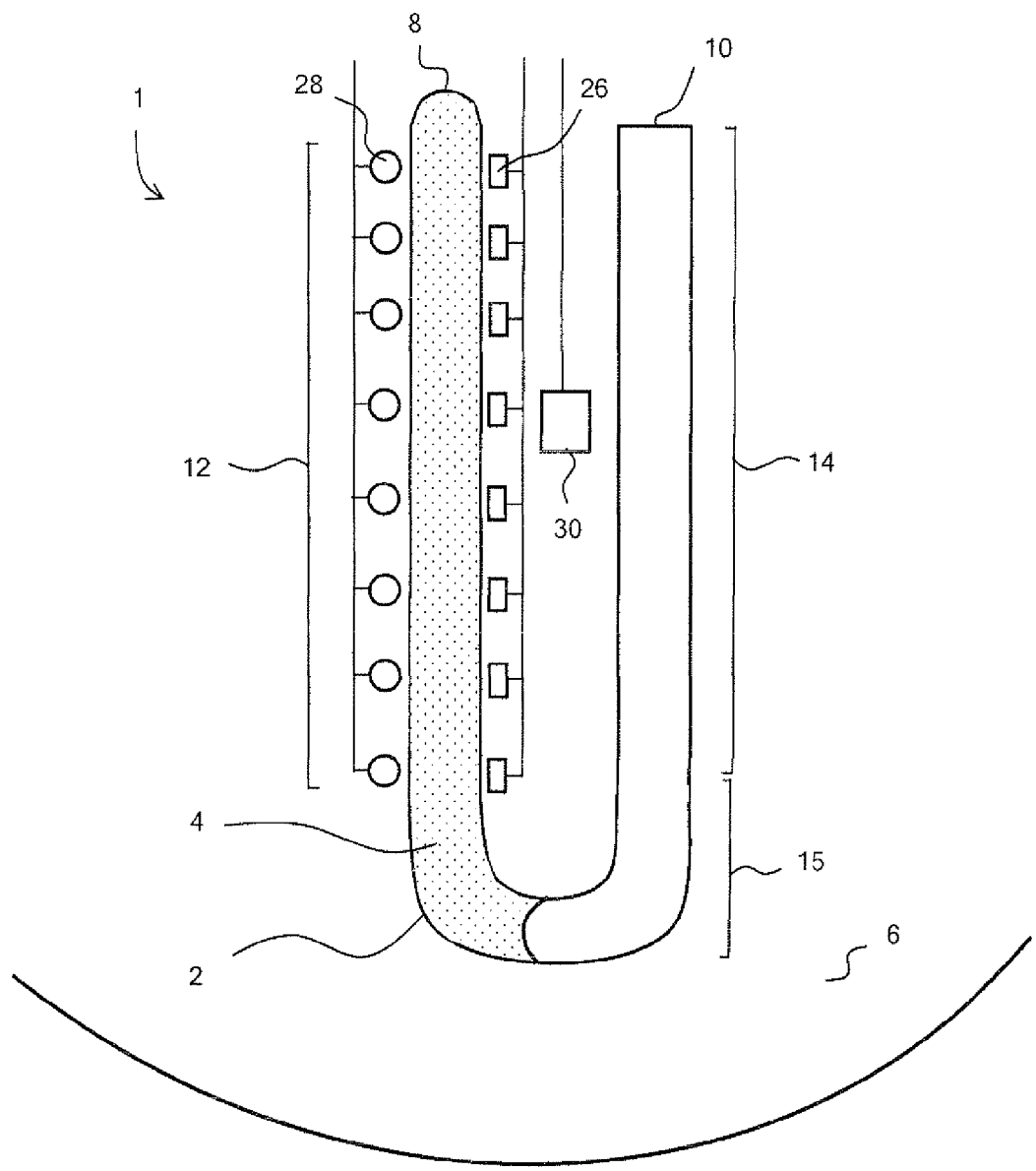
FIG. 4 is a plan view of a "U-shaped barometer from above.
Figure 5:
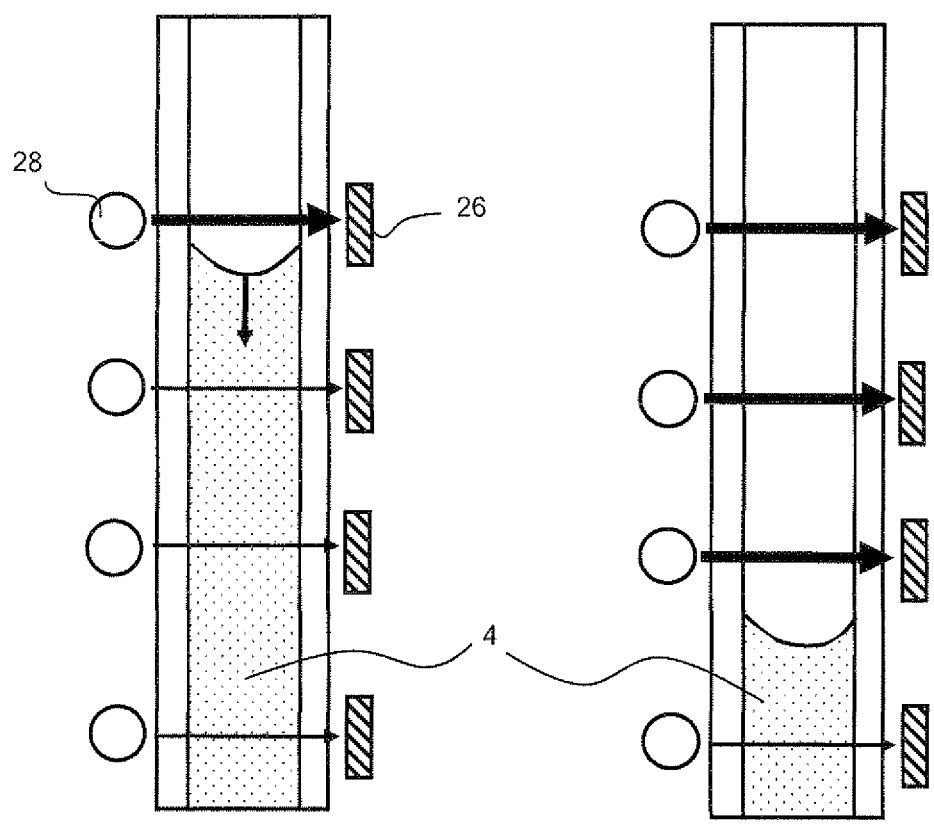
FIG. 5 is a schematic of the principle behind how the series of discrete sensors detect the position of the barometric fluid/vacuum interface.
Figure 6:
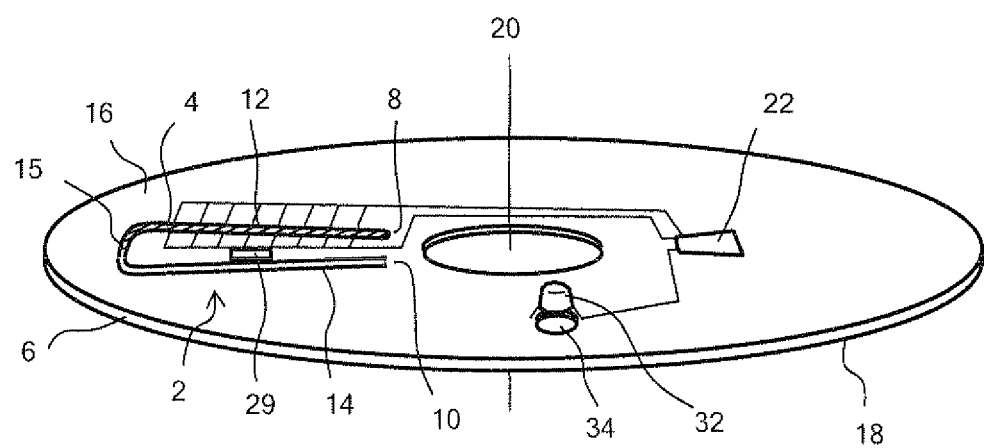
FIG. 6 is an isometric view of an annular barometer for use within an optical drive.

With reference to FIGS. 1 to 4, a barometer 1 comprises a "U-shaped" barometer tube 2, a barometric fluid 4 such as Aeroshell fluid 3 brand oil, is retained within the barometer tube and an annular printed circuit board 6 (acting as a rotatable mount). The "U-shaped" barometer tube comprises a sealed first end 8 and an open second end 10, The "U-shaped" barometer tube further comprises a first linear tube portion 12 adjacent to the sealed first end, a second linear tube portion 14 adjacent to the open second end and a curved tube portion connecting the first linear tube portion to the second linear tube portion.

The annular printed circuit board is 120 mm in diameter, the standard diameter of a compact disc, for example, and comprises a first side 16, an opposed second side 18 and a centre of rotation 20 adapted to cooperatively interact with the central spindle of an optical drive. The first side of the annular printed circuit board comprises a microcontroller 22, a series of discrete sensors 24 comprising light emitting diode (LED)/photodiode pairs, each photodiode 26 (acting as a detector) associated with an individual LED 28 (acting as a light source). The barometer further comprises a thermocouple 30 (acting as a temperature sensor).

The barometer tube is mounted on the first side of the annular printed circuit board such that the sealed first end and the open second end are adjacent to each other and the centre of rotation and the curved tube portion is adjacent to the outer rim of the printed circuit board. Accordingly, when the barometer is rotated, the direction of the applied acceleration is from the first and second ends towards the curved portion of the barometer tube. The series of discrete sensors are arranged such that the LEDs are located at calibrated intervals along the length of one side of the first linear tube portion of the barometer tube, and the photodiodes are located opposed to their associated LEDs on the second side of the first linear portion of the barometer tube, such that light from one LED passes through the barometer tube before being detected by the associated photodiode.

The barometric fluid comprises a dye which absorbs a significant portion of the light emitted by the LEDs such that light emitted from one of the LEDs is attenuated significantly before reaching the associated photodide.

The first side of the annular printed circuit board comprises an infra-red LED 32 and the annular printed circuit board comprises an aperture 34 located away from the centre of rotation, arranged such that radiation emitted by the infra-red LED passes though the aperture and the said radiation may be read by the laser reader of an optical drive.

When the barometer is stationary, the barometric fluid within the barometer tube abuts the sealed first end in the first linear tube portion. The light emitted by the LED of each LED/photodiode pair is attenuated as it passes through the barometric fluid within the barometer tube before being detected by the opposed photodiode, indicating that the barometric fluid is present at that point.

During operation, a computer is provided comprising an optical drive, a processor and a display. The barometer is placed within the optical drive of the computer and rotated by the central spindle mechanism of the optical drive. As the barometer begins to rotate, a software driver stored on the second side of the annular printed circuit board is read by the laser of the optical drive. One skilled in the art will be familiar with software for automatically executing a program stored on an optical disc, for example, using the AutoPlay facility in Microsoft Windows operating systems (Microsoft and Windows are trade marks of Microsoft Corporation, Redmond, Wash.). The software driver instructs the computer to rotate the barometer to a fixed maximum rate of rotation and to position the laser reader of the optical drive such that it may read data through the aperture of the annular printed circuit board from the infra-red LED on the first side of the annular printed circuit board.

The increasing rate of rotation produces an increase in the acceleration applied to the barometric fluid. When the acceleration applied is sufficient to overcome the pressure of air within the curved portion and second linear portion of the barometer tube, the barometric fluid within the first linear portion of the barometer tube moves away from the sealed first end, creating a vacuum between the barometric fluid and the sealed first end. As the rate of rotation of the barometer increases, the said barometric fluid/vacuum interface moves away from the sealed first end towards the curved portion of the barometer tube.

As the interface sequentially passes each LED/photodiode pair, the light received by the photodiode of the specific LED/photodiode pair increases and the said increase indicates that the barometric fluid is no longer within the barometer tube at that point. When the maximum rate of rotation is reached, the force exerted on the barometric fluid towards the outer rim of the barometer by the applied acceleration balances the air pressure within the barometer tube. Therefore, the position of the barometric fluid/vacuum interface is maintained.

The rate at which the barometric fluid/vacuum interface moves between LED/photodiode pairs during the increase in the rate of rotation of the barometer and the final position of the said interface allows the air pressure within the barometer tube to be calculated.

The temperature of the barometer (which is assumed to be the same as the temperature of the barometric fluid) is recorded and used to correct the calculated air pressure. In addition, calculated air pressure is corrected to take account of the surface tension of the barometric fluid and the compression of the air within the second portion of the barometer tube. The formulas for each correction are well known in the art.

The calculated value of the air pressure within the barometer tube, after the said correction to relate to the air pressure within the locality of the barometer, is transmitted by the infra-red LED on the first side of the annular printed circuit board through the said aperture in the annular printed circuit board to the laser reader of the optical drive before being displayed to the user via the computer display. For example, the microcontroller of the printed circuit board may control whether the infra-red LED is on or off each time that the LED passes over the infra-red light detector of the optical drive. Thus, the microcontroller can transmit data (e.g. a pressure reading in any appropriate units) to the computer through the LED and the infra-red light detector of the optical drive, using a simple binary representation or another encoding known for infra-red data transfer.

Alternatively, the change in position of the barometric fluid/vacuum interface may be recorded as the rate of rotation of the barometer decreases and the acceleration applied to the barometric fluid is correspondingly reduced. The change in position of the said interface may be recorded both during the period of increasing rate of rotation (applied acceleration increasing) and the period of decreasing the rate of rotation (applied acceleration decreasing).

In alternative embodiments of the invention, software driver stored on the second side of the annular printed circuit board may provide the processor of the computer with the formulas for calculating the air pressure from the recorded values of the temperature, position of the barometric fluid/vacuum interface and change in the position of the said interface, correcting for the thermal expansion of the barometric fluid and compression of air within the barometer tube. The infra-red LED may transmit the recorded values to the computer via the laser reader of the optical drive, such that the processor of the computer may calculate the value of the air pressure. The calculated value may then be displayed on the computer screen to the user.

Embodiment 2

In an alternative embodiment, the barometer tube comprises a first tube portion 40 adjacent to a sealed first end 42, a second tube portion 44 adjacent to an open second end 46 and a reservoir 48 connecting the first tube portion to the second tube portion. The reservoir retains Aeroshell fluid 3, acting as a barometric liquid 50. The first tube portion comprises the first sealed end and a second open end 52, and extends into the reservoir such that the second open end is beneath the surface 54 of the barometric fluid retained within the reservoir.

The second tube portion is connected to the reservoir via a valve 56 such that, when the barometer is not in use, barometric fluid may be prevented from entering the second tube portion and potentially leaking out of the barometer.

The barometer comprises a housing 58 within which the barometer tube is housed, suitable for use with a centrifuge (not shown). The barometer tube is oriented within the housing such that when the barometer is used with a centrifuge, the vector of acceleration applied to the barometer by the centrifuge is along the barometer tube from the first and second ends to the reservoir.

The housing comprises a series of discrete sensors 60 comprising LED/photodiode pairs, (each LED 62 acting as a light source and each photodiode 64 acting as a light detector), a microcontroller 66 and a digital display 66. The said pairs are arranged along the length of the first tube portion at regular intervals, such that light emitted from an LED passes through the barometer tube at that point before being detected by the associated photodiode. The barometric fluid comprises a dye such that the barometric fluid absorbs a proportion of light emitted by the LEDs to significantly attenuate the light received by the associated photodiode.

Before rotation, the first tube portion is completely filled with barometric fluid, and the second tube portion is isolated from the reservoir and is in fluid contact with the air outside the barometer via the open second end. The valve is then opened such that the barometric fluid within the reservoir is in contact with the air in the second tube portion, and the barometer is then placed within a centrifuge. The air pressure on the barometric fluid within the reservoir is sufficient to prevent the barometric fluid within the first tube portion from emptying into the reservoir.

When the centrifuge is activated, the barometer is rotated at an increasing rate, producing a corresponding increasing acceleration applied to the barometric fluid. When the applied acceleration is sufficiently large, the barometric fluid begins to flow out of the first tube portion into the reservoir, producing a vacuum adjacent to the sealed first end. The barometric fluid/vacuum interface progresses down the first tube portion as the applied acceleration increases. As the said interface passes LED/photodiode pairs, the light received by each photodiode from their associated LED increases as the barometric fluid no longer attenuates the light.

The rate at which the barometric fluid/vacuum interface passes the LED/photodiode pairs and the final interface position when the barometer is rotated at the maximum rate is recorded, and used by the microcontroller to calculate the air pressure. The calculated air pressure is then displayed on the digital display and the centrifuge stopped. The user may then read value of the air pressure from the digital display.

Alternatively, the change in position of the barometric fluid/vacuum interface may be recorded as the rate of rotation of the barometer decreases and the acceleration applied to the barometric fluid is correspondingly reduced. The change in position of the said interface may be recorded both during the period of increasing rate of rotation (applied acceleration increasing) and the period of decreasing the rate of rotation (applied acceleration decreasing).

Further variations and modifications may be made within the scope of the invention herein disclosed.

The invention claimed is:

1. A barometer comprising a barometer tube retaining barometric fluid; wherein the barometer tube is adapted to be rotated, the barometer tube is shorter than that required by a barometer not adapted to be rotated and wherein the barometer tube has a sealed end and an open end and the length of the barometer tube is such that when the barometer is at rest and the open end is at standard atmospheric pressure, the barometric fluid abuts the sealed end.

2. A barometer according to claim 1, wherein the barometer tube is less than 25 cm in length.

3. A barometer according to claim 1, wherein the barometer tube retains a barometric fluid having a lower density than that of mercury.

4. A barometer according to claim 1, wherein the barometer is rotatable within a centrifuge.

5. A barometer according to claim 1, wherein the barometer comprises a rotatable mount, the rotatable mount having a centre of rotation.

6. A barometer according to claim 5, wherein the barometer tube is located on the rotatable mount on one side of the centre of rotation.

7. A barometer according to claim 1, wherein the barometer tube comprises a sealed first end and an open second end, and the open second end is within 10% of the span of the rotatable mount of the centre of rotation.

8. A barometer according to claim 1, wherein the barometer further comprises a sensor operable to measure data relating to position of the barometric fluid/vacuum interface whilst the barometer is being rotated.

9. A barometer according to claim 8, wherein the sensor comprises a series of discrete sensors, each discrete sensor within the series of discrete sensors being operable to indicate whether the barometric fluid extends over a specific position in the barometer tube.

10. A barometer according to claim 8, wherein the barometer is suitable for use with an optical drive.

11. A barometer according to claim 10, wherein the rotatable mount is generally planar and comprises a first side comprising the barometer tube and an opposed second side; the barometer further comprising a processor operable to calculate air pressure from the position of the barometric fluid/vacuum or barometric fluid/air interface; wherein the calculated air pressure is readable from the second side of the rotatable mount by the laser of an optical drive.

12. A method of taking a measurement of air pressure comprising the steps of;
providing a barometer according to claim 10, and a computer comprising an optical drive, a processing unit and a display;
inserting the barometer into the optical drive of the computer;
reading the calculated air pressure from the barometer with the laser of the optical drive; and
displaying the calculated air pressure on the display of the computer.

13. A method of taking a measurement of air pressure comprising the steps of:
providing a barometer according to claim 1;
rotating the barometer; and
taking a reading of the air pressure from the barometer whilst the barometer is being rotated.

14. A method of taking a measurement of air pressure according to claim 13, wherein the reading of air pressure is taken by photography.

15. A barometer according to claim 1, wherein the barometer tube is less than 84 cm in length.

16. A barometer according to claim 15, wherein the barometric fluid has a density lower than that of mercury.

* * * * *